US006633420B2

United States Patent
Huang

(10) Patent No.: US 6,633,420 B2
(45) Date of Patent: Oct. 14, 2003

(54) OPTOELECTRONIC TRANSCEIVER MODULE

(75) Inventor: Nan Tsung Huang, Tu-Chen (TW)

(73) Assignee: Hon Hai Precision Ind. Co., Ltd., Taiepi Hsien (TW)

( * ) Notice: Subject to any disclaimer, the term of this patent is extended or adjusted under 35 U.S.C. 154(b) by 112 days.

(21) Appl. No.: 09/939,159

(22) Filed: Aug. 24, 2001

(65) Prior Publication Data

US 2003/0000725 A1 Jan. 2, 2003

(30) Foreign Application Priority Data

Jun. 6, 2001 (TW) ...................................... 90209364 U

(51) Int. Cl.[7] ................................................ G02B 26/08

(52) U.S. Cl. ....................... 359/163; 359/154; 359/159; 359/109; 174/53; 174/521; 174/54; 174/58; 174/61; 439/327; 439/282; 439/267

(58) Field of Search ........................... 455/73; 359/159, 359/109, 154, 163; 174/53, 52.1, 54, 58, 61; 439/327, 282, 267

(56) References Cited

U.S. PATENT DOCUMENTS

| | | | | | |
|---|---|---|---|---|---|
| 4,672,685 | A | * | 6/1987 | Phillips et al. | 455/575 |
| 5,312,160 | A | * | 5/1994 | Davis et al. | 297/397 |
| 5,528,408 | A | * | 6/1996 | McGinley et al. | 359/152 |
| 5,875,047 | A | * | 2/1999 | Abe et al. | 359/152 |
| 6,024,500 | A | * | 2/2000 | Wolf | 385/92 |

* cited by examiner

*Primary Examiner*—Dean A. Reichard
*Assistant Examiner*—Anton Harris
(74) *Attorney, Agent, or Firm*—Wei Te Chung

(57) ABSTRACT

A transceiver module which is easily and conveniently assembled, and which is reliable. The transceiver module comprises a housing, an optoelectronic subassembly, a receptacle, a chassis and a PCB. The optoelectronic subassembly is received in the receptacle. Conductive leads of the optoelectronic subassembly are soldered to the PCB. The chassis is attached to the PCB with screws, and accommodates and protects the PCB. The housing comprises a top housing and a bottom housing. The top housing is attached to the chassis and the receptacle. The top housing and bottom housings are attached together, enclosing therein the receptacle, the chassis and the PCB.

11 Claims, 4 Drawing Sheets

OPTOELECTRONIC TRANSCEIVER MODULE

BACKGROUND OF THE INVENTION

1. Field of the Invention

The present invention generally relates to optoelectronic transceiver modules for fiber-optic communications, and in particular to optoelectronic transceiver modules which can be conveniently assembled and which are reliable.

2. Description of the Related Art

Optoelectronic transceiver modules provide for bi-directional transmission of data between an electrical interface and an optical data link. The module receives electrically encoded data signals which are converted into optical signals and transmitted over the optical data link. Conversely, the module receives optically encoded data signals which are converted into electrical signals and transmitted onto the electrical interface.

There is a need for a transceiver module which is highly reliable and durable. All parts of the module must be securely fixed together to avoid displacement of any part during use of the module. There is also a need for the module to be easily assembled.

U.S. Pat. No. 6,178,096 B1 discloses a conventional optoelectronic transceiver module. The module comprises a top cover and a bottom cover. The top bottom covers are fixed together by mating a position post of the top cover in a hole of the bottom cover. The top and bottom covers thereby enclose a printed circuit board (PCB) and optoelectronic components. However, when the module is subjected to vibration, the top and bottom covers of the module are easily displaced, thus reducing the efficacy of the module.

U.S. Pat. No. Re. 36,820 discloses another conventional optoelectronic transceiver module. A PCB and other optoelectronic components are placed in a rectangular box. By injecting potting material into the box, the PCB and the optoelectronic components can be enclosed. The enclosure of the transceiver module fixes and protects the PCB. However, potting material is expensive and unduly troublesome to use.

In view of the above, there is a need for a transceiver module which can be easily and quickly installed, and all parts of which are fixed together reliably.

SUMMARY OF THE INVENTION

Therefore, one object of the present invention is to provide a transceiver module, all parts of which are fixed together reliably.

Another object of the present invention is to provide a transceiver module which can be easily and quickly assembled.

The transceiver module of the present invention comprises a housing, an optoelectronic subassembly, a receptacle, a chassis and a PCB. The optoelectronic subassembly is received in the receptacle. Conductive leads of the optoelectronic subassembly are soldered to the PCB. The chassis is attached to the PCB with screws, and accommodates and protects the PCB. The housing comprises a top housing and a bottom housing. The top housing is attached to the chassis and the receptacle. The top housing and the bottom housing are attached together, enclosing therein the receptacle, the chassis and the PCB.

DETAILED DESCRIPTION OF THE INVENTION

Figure 1:
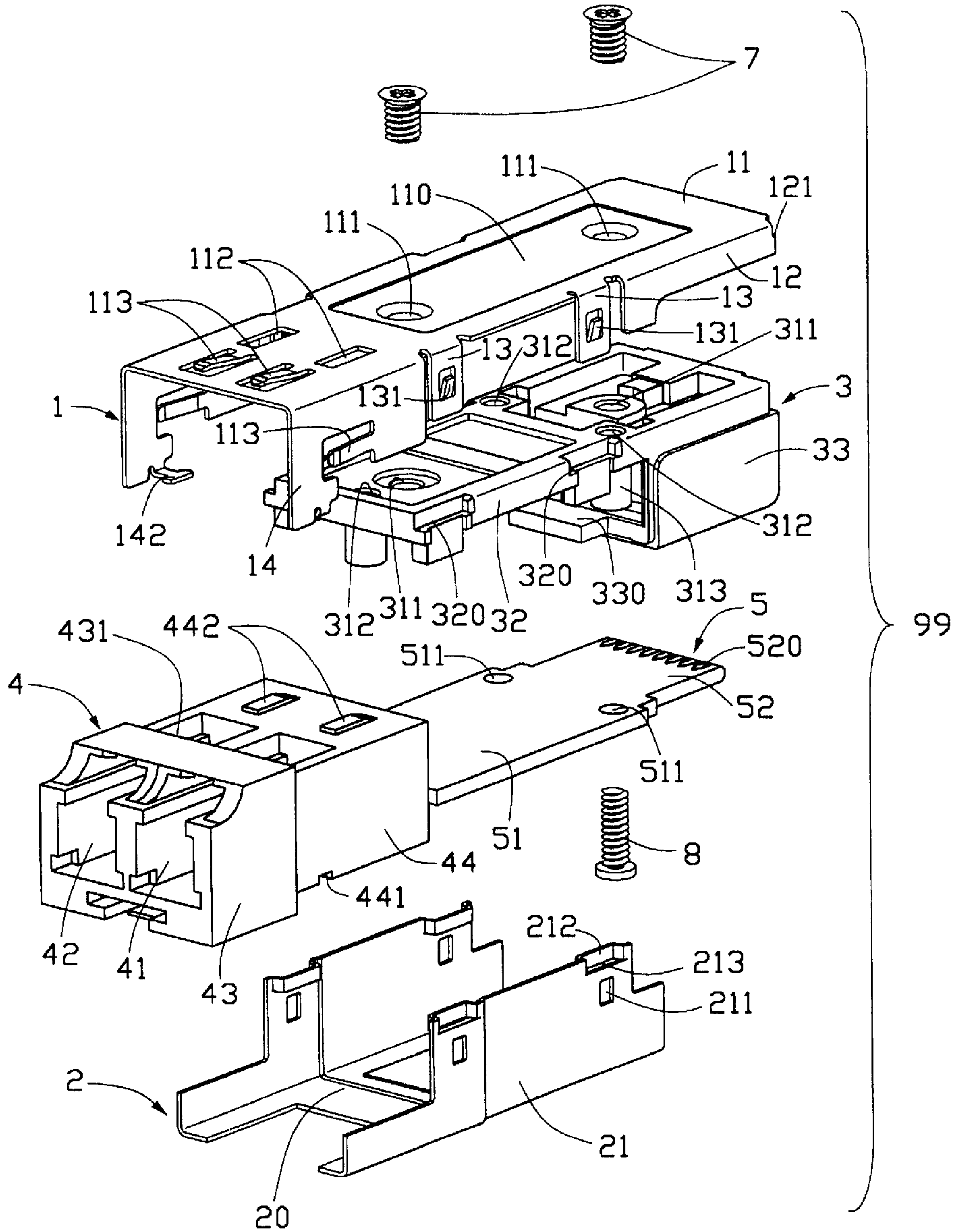
FIG. 1 is an exploded perspective view of an optoelectronic transceiver module in accordance with the present invention.

Referring to FIG. 1, an optoelectronic transceiver module 99 in accordance with the present invention has a top housing 1, a bottom housing 2, a chassis 3, a receptacle 4, a PCB 5 and an optoelectronic subassembly 6.

Figure 3:
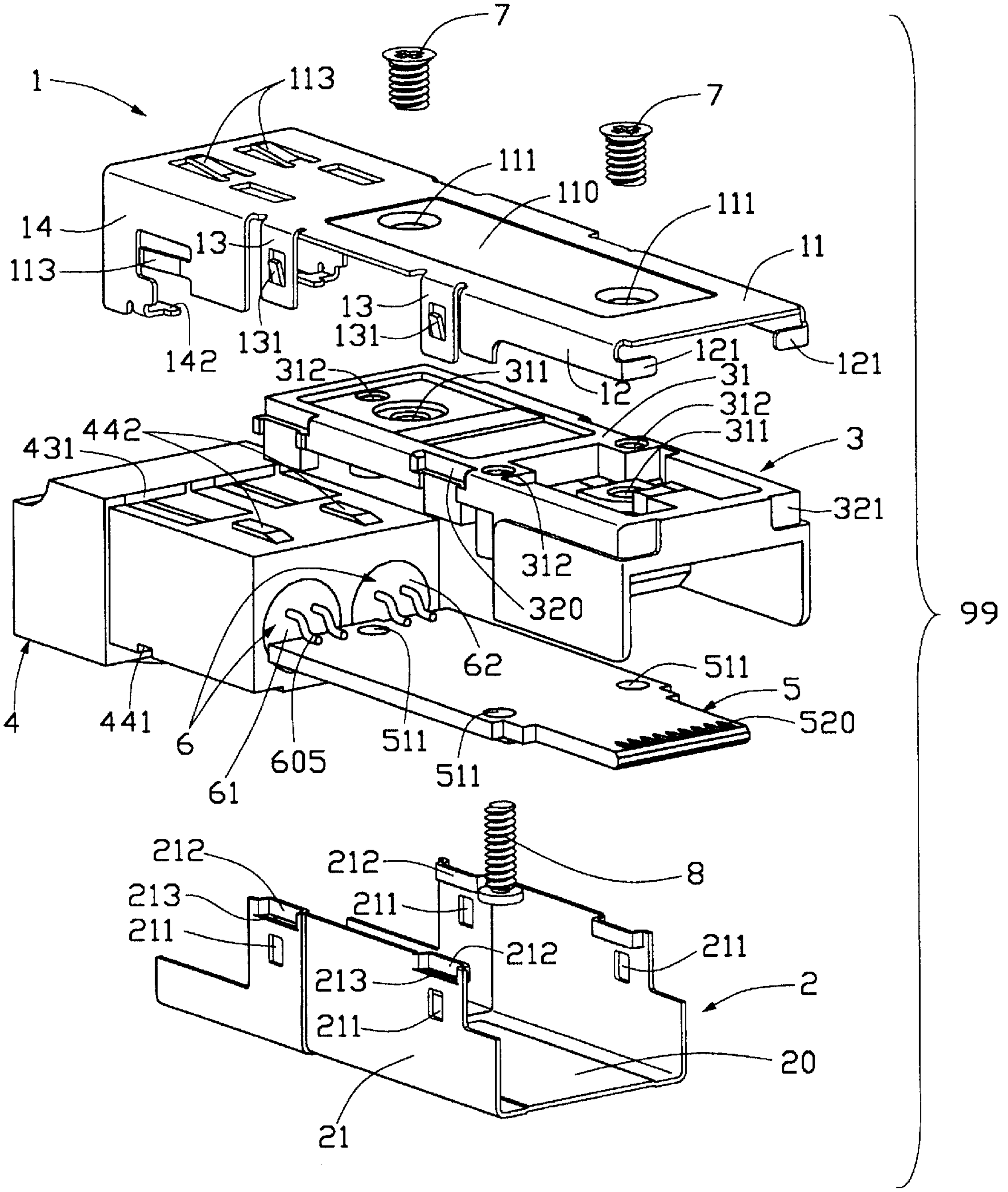
FIG. 3 is an exploded perspective view of the optoelectronic transceiver module of FIG. 1, but viewed from still another aspect.

The receptacle 4 has the shape of an oblong box. The receptacle 4 comprises a front portion 43 and a rear portion 44. The size of the front portion 43 is large than that of the rear portion 44. Thus a rear face 431 is defined on the front portion 43 around a periphery of a junction of the front and rear portions 43, 44, for abutting a front edge of the top housing 1. Referring also to FIG. 3, the front portion 43 defines two openings 41, 42 though the receptacle 4. Rear portions of the openings 41, 42 are for receiving the optoelectronic subassembly 6, and front portions of the openings 41, 42 are for connecting with an optical connector (not shown) to output optical signals. The optoelectronic subassembly 6 comprises a transceiver. The transceiver comprises a transmitter 61 and a receiver 62. The transmitter 61 may typically be a laser diode (LD) or light emitting diode (LED), and the receiver 62 may typically be a photo diode. A plurality of conductive leads 605 extends from a rear of the transceiver, and is soldered to the PCB 5. Two T-shaped grooves 441 are defined in a bottom surface of the rear portion 44 of the receptacle 4, for engagement of the receptacle 4 with the top housing 1. A pair of protuberances 442 is formed on a top surface of the receptacle 4.

Figure 2:
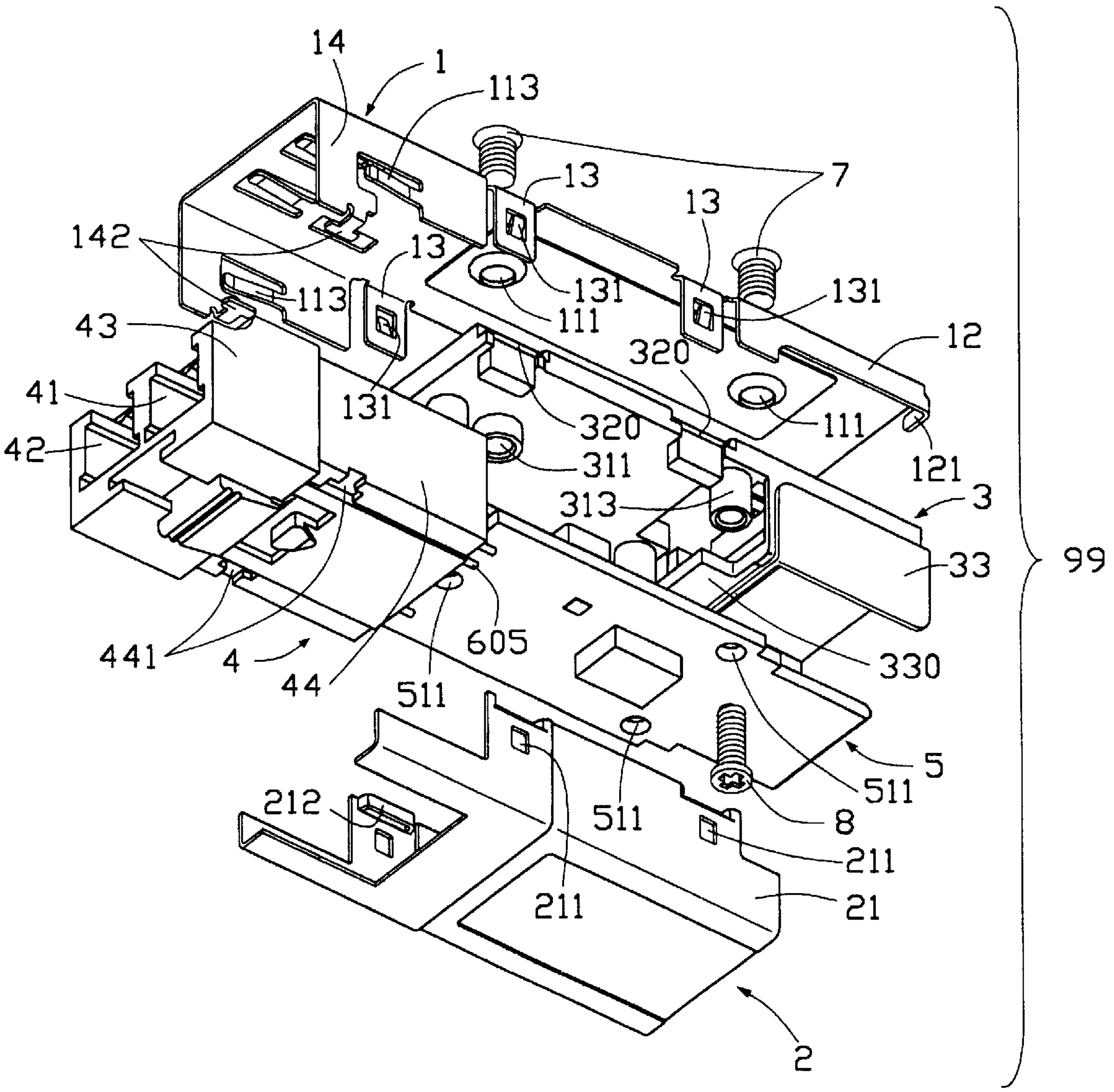
FIG. 2 is an exploded perspective view of the optoelectronic transceiver module of FIG. 1, but viewed from another aspect.

Referring also to FIG. 2, the PCB 5 has a narrow rear section 52 and a wide front section 51. Three position holes 511 are defined through the PCB 5 in the vicinity of three edges thereof respectively. The conductive leads 605 of the optoelectronic subassembly 6 are soldered to the front section 51 of the PCB 5, to establish electrical contact between the optoelectronic subassembly 6 and the PCB 5. The rear section 52 of the PCB 5 has a row of electrical contacts 520 at a rear end thereof, for electrical connection of the PCB 5 with an electrical connector (not shown).

The chassis 3 may be made of metal, plastic or other suitable material. The chassis 3 generally has the shape of an oblong box, for accommodating and protecting the PCB 5. Three poles 313 depend from a bottom face of the plate 31 of the chassis 3. Three screw holes 312 are defined in a top face of the plate 31 of the chassis 3 and through the three poles 313 respectively, corresponding to the three position holes 511 of the PCB 5. A rear of the chassis 3 forms a seat 33. A support plate 330 extends forwardly from a bottom of the seat 33. Two screw holes 311 are defined in the chassis 3. The chassis 3 has a pair of opposite side walls 32. Two spaced recesses 320 are defined at a top edge of each side wall 32, for engagement of the chassis 3 with the bottom housing 2. A pair of depressions 321 (see FIG. 3) is defined in opposite sides of a rear end of the chassis 3. Three fastening components, such as screws 8 (only one shown), are for fixing the PCB 5 on the chassis 3.

The bottom housing 2 is made of metal, and has a generally U-shaped configuration. The bottom housing 2 has a rectangular bottom wall 20, and two side walls 21 extending perpendicularly upwardly from the bottom wall 20. Two protrusions 212 are inwardly formed at front and rear ends of a top of each side wall 21, for engaging in the recesses 320 of the chassis 3. A slot 213 is defined below each protrusion 212 of each side wall 32. A rectangular opening 211 is defined in each side wall 21 below each slot 213. The slots 213 and the rectangular openings 211 are for mating with the top housing 1.

The top housing 1 is made of metal, and has a top wall 11. A shallow trough 110 is formed at a middle of the top wall 11. Two annular flanges (not labeled) extend downwardly from the trough 110. Two position holes 111 are respectively defined in the annular flanges, corresponding to the screw holes 311 of the chassis 3. A pair of parallel grounding tabs 113 is formed near a front end of the top wall 11 of the top housing 1. A pair of parallel rectangular openings 112 is defined between the grounding tabs 113 and the trough 110, corresponding to the protuberances 442 of the receptacle 4. A pair of forward side walls 14 depends from opposite sides of the top wall 11 of the top housing 1. A pair of rearward side walls 12 depends from opposite sides of the top wall 11 of the top housing 1. Two pairs of locking tabs 13 respectively depend from opposite sides of the top wall 11 of the top housing 1, between the forward and rearward side walls 14, 12. A T-shaped flap 142 is inwardly formed at a bottom of each forward side wall 14, for engaging in the T-shape grooves 441 of the receptacle 4. Each forward side wall 14 has a grounding tab 113. A tab 121 (best seen in FIG. 3) extends inwardly from a rear end of each rearward side wall 12, for engaging in the depressions 321 of the chassis 3. Each locking tab 13 is a rectangular plate, the size of which corresponds to each slot 213 of the bottom housing 2. A spring tongue 131 is outwardly formed at a center of each locking tab 13. A lower end of each spring tongue 131 is integrally joined with the locking tab 13, and an upper end of each spring tongue 131 protrudes outwardly from the locking tab 13. Two fastening components, such as screws 7, are for attaching the top housing 1 to the chassis 3.

Figure 4:
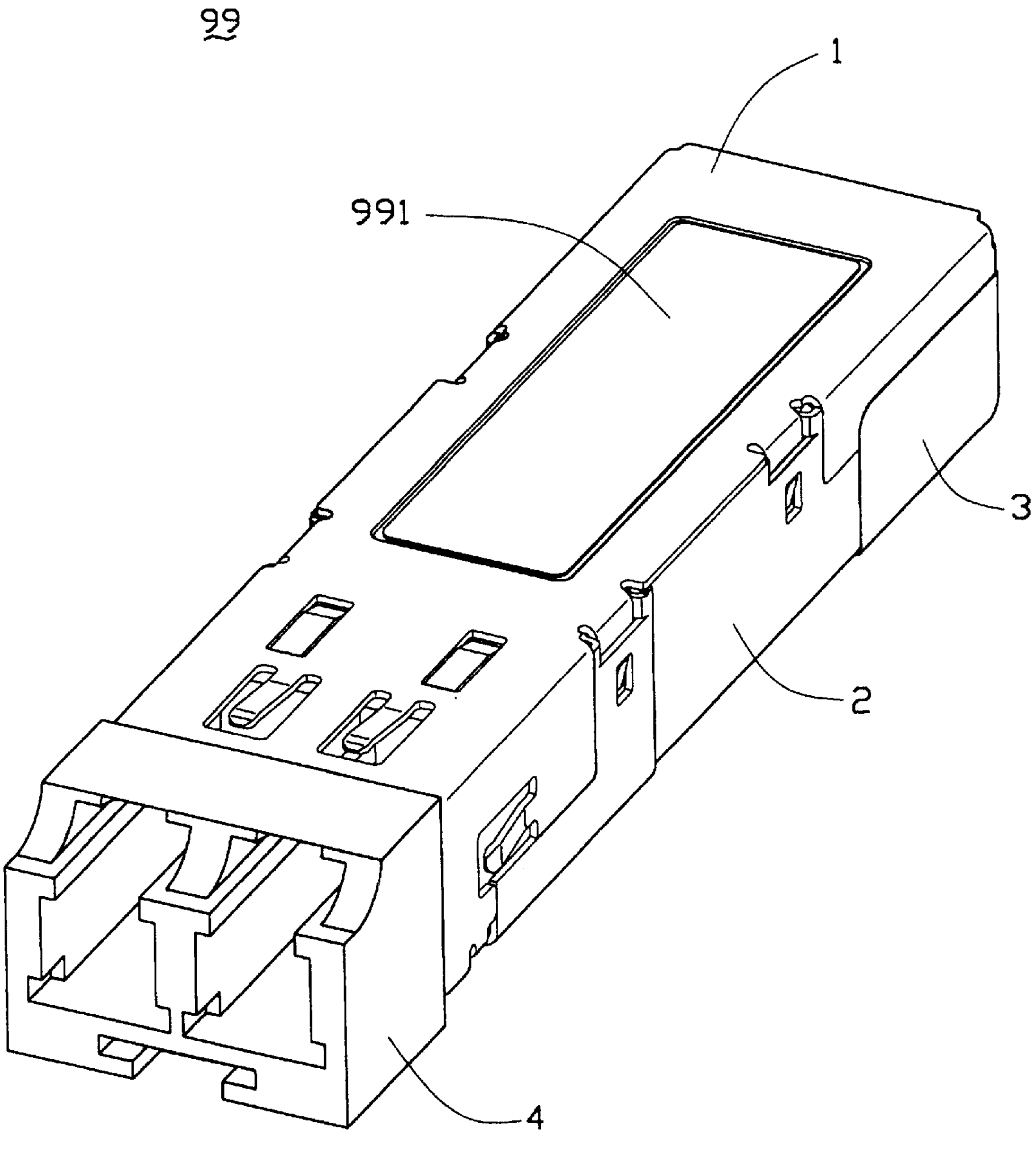
FIG. 4 is an assembled view of the optoelectronic transceiver module of FIG. 1.

Referring to FIG. 4, a labeling tape 991 is for attachment to the optoelectronic transceiver module 99 after assembly.

In assembly of the optoelectronic transceiver module 99, the PCB 5 and the chassis 3 are firstly attached together. The rear section 52 of the PCB 5 is inserted into the seat 33 of the chassis 3. The poles 313 of the chassis 3 press down on the PCB 5, and the support plate 330 of the chassis 3 supports the PCB 5 by abutting against a bottom face thereof. The screws 8 are extended through the position holes 511 of the PCB 5 to threadedly engage in the screw holes 312 of the poles 313. The top housing 1 is then attached to the receptacle 4 and the chassis 3. The screws 7 are extended through the position holes 111 of the top housing 1 to threadedly engage in the screw holes 311 of the chassis 3. The protuberances 442 of the receptacle 4 are received in the openings 112 of the top housing 1. The T-shaped flaps 142 of the top housing 1 are engaged in the T-shaped grooves 441 of the receptacle 4. Finally, the bottom housing 2 is attached to the chassis 3 and the top housing 1. The locking tabs 13 of the top housing 1 are extended through the slots 213 of the bottom housing 2 until the spring tongues 131 of the locking tabs 13 engage in the openings 211 of the bottom housing 2. The protrusions 212 of the bottom housing 2 are engaged in the recesses 320 of the chassis 3. FIG. 4 shows the finally assembled optoelectronic transceiver module 99. The labeling tape 991 is glued to the trough 110 of the top housing 1, to show some information about the optoelectronic transceiver module 99 and to cover the screws 7.

The chassis 3 of the optoelectronic transceiver module 99 is preferably made of metal. The PCB 5 at the position holes 511 is coated with conductive material, and the conductive material is connected with a grounding circuit of the PCB 5. The chassis 3 is thus electrically connected with the grounding circuit of the PCB 5 via the screws 8 which engage with the conductive coating at the position holes 511. The top and bottom housings 1, 2 electrically contact with the chassis 3. The optoelectronic transceiver module 9 thus effectively forms a grounding path between the grounding circuit of the PCB 5 and the top and bottom housings 1, 2. Thus any static charge which develops on the top or bottom housing 1, 2 is effectively dissipated.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optoelectronic transceiver module comprising:

an optoelectronic subassembly for receiving and sending optical signals;

a receptacle including at least one opening receiving the optoelectronic subassembly;

a printed circuit board electrically contacting with the optoelectronic subassembly;

a chassis for fixing and holding the printed circuit board;

a first housing including a cover and at least one locking tab extending from at least one of opposite sides of the cover; and a second housing fixed to the first housing to encapsulate the circuit board and the chassis, at least one slot being defined in the second housing and mating with the at least one locking tab of the first housing; wherein the first housing includes a pair of rearward side walls depending from opposite sides thereof, and a tab extends from a rear end of each of said rearward side walls for engaging in a corresponding depression defined in a rear end of the chassis.

2. The optoelectronic transceiver module as described in claim 1, wherein the optoelectronic subassembly includes a laser diode and a photo diode.

3. The optoelectronic transceiver module as described in claim 1, wherein the optoelectronic subassembly includes conductive leads soldered to the circuit board to establish electrical contact between the optoelectronic subassembly and the printed circuit board.

4. The optoelectronic transceiver module as described in claim 1, wherein the receptacle includes at least one protuberance, and the first housing includes at least one hole engagingly receiving the at least one protuberance.

5. The optoelectronic transceiver module as described in claim 1, wherein the at least one locking tab of the first housing includes at least one spring tongue at a center thereof.

6. The optoelectronic transceiver module as described in claim 5, wherein the second housing includes a bottom wall and two side walls extending perpendicularly from the bottom wall, at least one protrusion is formed on a top of at least one side wall, and at least one slot is defined below the at least one protrusion.

7. The optoelectronic transceiver module as described in claim 6, wherein at least one side wall includes at least one opening beneath the at least one slot, for engagingly receiving the at least one spring tongue of the at least one locking tab of the first housing.

8. The optoelectronic transceiver module as described in claim 7, wherein the chassis includes two side walls, at least one said side wall having at least one recess for receiving the at least one protrusion of the second housing.

9. An optoelectronic transceiver module comprising:

an optoelectronic subassembly for receiving and sending optical signals;

a receptacle for receiving the optoelectronic subassembly and including a bottom surface having at least two grooves;

a printed circuit board electrical contacting with the optoelectronic subassembly;

a chassis for fixing and holding the circuit board;

a first housing including a cover and a pair of forward side walls and at least one locking tab depending from each side of the cover, a bottom of each forward side wall having at least one flap for mating in the grooves of the receptacle; and a second housing fixed to the first housing to encapsulate the printed circuit board and the chassis, at least one slot being defined in the second housing and engagingly receiving the at least one locking tab of the first housing.

10. An optoelectronic transceiver module comprising:

an optoelectronic subassembly for receiving and sending optical signals;

a receptacle receiving the optoelectronic subassembly and including a top surface with at least one protuberance and a bottom surface with at least two grooves;

a printed circuit board electrically contacting with the optoelectronic subassembly;

a chassis for fixing and holding the circuit board;

a first housing including a cover, a pair of forward side walls depending from each side of the cover, a pair of rearward side walls, and at least one locking tab, at least one opening defined in the cover for mating with the at least one protuberance of the receptacle, a bottom of each forward side wall having at least one flap for mating in the grooves of the receptacle, a tab formed at a rear end of each rearward side wall for engaging in a corresponding depression defined in a rear end of the chassis; and a second housing fixed to the first housing by the at least one locking tab to encapsulate the circuit board and the chassis.

11. An optoelectronic transceiver module comprising:

a receptacle including at least one opening receiving an optoelectronic subassembly therein;

a printed circuit board extending rearwardly from a rear portion of the receptacle, said printed circuit board defining thereof a front edge portion connected to said optoelectronic subassembly and a rear edge portion with a plurality of conductors thereon;

a chassis positioned behind a rear portion of the receptacle and supporting said printed circuit board, said chassis defining a seat through which the rear edge portion of the printed circuit board extends; and a metal top cover and a metal bottom cover commonly fixedly enclosing all the receptacle, the chassis and the printed circuit board therein.

* * * * *